(12) United States Patent
Zeng

(10) Patent No.: US 6,928,201 B2
(45) Date of Patent: Aug. 9, 2005

(54) METHOD AND APPARATUS FOR PROVIDING CONTROLLABLE SECOND-ORDER POLARIZATION MODE DISPERSION

(75) Inventor: Ke-Cai Zeng, Hayward, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 151 days.

(21) Appl. No.: 10/295,587

(22) Filed: Nov. 15, 2002

(65) Prior Publication Data

US 2004/0096140 A1 May 20, 2004

(51) Int. Cl.[7] .............................................. G02B 6/00
(52) U.S. Cl. ........................ 385/11; 398/81; 398/147; 398/149; 398/158; 398/159
(58) Field of Search .................... 385/11; 398/147–149, 398/158, 159, 81

(56) References Cited

U.S. PATENT DOCUMENTS

| | | | | |
|---|---|---|---|---|
| 6,385,356 B1 | * | 5/2002 | Jopson et al. ................. | 385/11 |
| 6,707,587 B1 | * | 3/2004 | Zeng ........................... | 359/238 |
| 6,778,782 B1 | * | 8/2004 | Watley et al. ............... | 398/147 |
| 2002/0015547 A1 | * | 2/2002 | Patel ........................... | 385/11 |
| 2003/0108267 A1 | * | 6/2003 | Bandemer et al. ........... | 385/11 |
| 2003/0223056 A1 | * | 12/2003 | Fu et al. ...................... | 356/73.1 |

OTHER PUBLICATIONS

M. Wegmuller, S. Demma, C. Vinegoni, and N. Gisin, "Emulator of First–and Second–Order Polarization–Mode Dispersion" *IEEE Photonics Technology Letters*, vol. 14, No. 5, pp. 630–632, May 2002.

Frank Bruyere, "Impact of First–and Second–Order PMD in Optical Digital Transmission Systems" *Optical Fiber Technology*, 2, Art. No. 0033, pp. 269–280, 1996.

Philippe Ciprut, B. Gisin, Nicolas Gisin, Rogerio Passy, J.P. Von der Weid, F. Prieto, and Christian W. Zimmer, "Second–Order Polarization Mode Dispersion: Impact on Analog and Digital Transmissions," *J. Lightwave Technol.*, vol. 16, No. 5, pp. 757–771, May 1998.

* cited by examiner

*Primary Examiner*—Leonidas Boutsikaris
(74) *Attorney, Agent, or Firm*—Mikio Ishimaru

(57) ABSTRACT

A method and apparatus for providing controllable second-order polarization mode dispersion for fiber optic transmission systems are provided. A section of fixed high birefringent optical fiber, a polarization controller, and a variable differential group delay module are provided. The polarization controller is connected to the optical fiber section, and the variable differential group delay module is connected to the polarization controller. The variable differential group delay module is controlled to vary the second-order polarization mode dispersion values at an output of the high birefringent optical fiber section.

16 Claims, 2 Drawing Sheets

300

PROVIDING AN OPTICAL FIBER SECTION OF FIXED HIGH BIREFRINGENT OPTICAL FIBER
302

PROVIDING A POLARIZATION CONTROLLER CONNECTED TO THE OPTICAL FIBER SECTION
304

PROVIDING A DIFFERENTIAL GROUP DELAY MODULE CONNECTED TO THE POLARIZATION CONTROLLER
306

CONTROLLING THE DIFFERENTIAL GROUP DELAY MODULE TO VARY THE SECOND-ORDER POLARIZATION MODE DISPERSION VALUES AT AN OUTPUT OF THE OPTICAL FIBER SECTION
308

FIG. 3

METHOD AND APPARATUS FOR PROVIDING CONTROLLABLE SECOND-ORDER POLARIZATION MODE DISPERSION

TECHNICAL FIELD

The present invention relates generally to the field of telecommunications and more particularly to fiber optic transmission systems.

BACKGROUND ART

The extremely high communications bandwidth of fiber optics technology and transmission systems has revolutionized telecommunications. A single beam of modulated laser light can carry vast amounts of information equaling hundreds of thousands of phone calls or hundreds of video channels. Bandwidth capabilities have been more than doubling every two to three years.

A fiber optic transmission system typically includes the optical transmitter, an optical fiber, an optical amplifier, and an optical receiver.

The optical transmitter receives an electrical digital signal and converts it into an optical is signal by modulating a laser light into optical signal pulses, which represent the various values or states of the electrical digital signal.

The optical signal pulses are transmitted through the optical fiber and, generally, are amplified by one or more optical amplifiers before being converted back into electrical digital signals by the optical receiver. This is generally referred to as the optical link or optical channel.

The optical signal pulses arriving at the optical receiver must be of sufficient quality to allow the optical receiver to clearly distinguish the on-and-off pulses of light signals sent by the optical transmitter. However, noise, attenuation, and dispersion are a few of the impairments that can distort the optical signal pulses, rendering the optical signal pulses marginal or unusable at the optical receiver and making it difficult or impossible to accurately detect or reconstitute the electrical digital signal. The distortion nonuniformly broadens, spreads, or widens the various optical signal pulses, reducing the spacing between the pulses or causing them to overlap, thereby rendering them virtually indistinguishable.

Conventionally, a properly designed optical channel can maintain a Bit Error Rate ("BER") of $10^{-13}$ or better. When an optical channel degrades to a BER of $10^{-8}$, a telecommunications system may automatically switch to an alternate optical channel in an attempt to improve the BER. Otherwise, the telecommunications system must operate at a reduced or lowered bandwidth, with poorer overall system performance.

Dispersion is a major contributor to distortion of optical signal pulses, leading to increases in the BER. The distortion caused by dispersion generally increases with increases in the bandwidth or data rate, and with increases in the optical fiber transmission distance.

Dispersion has generally been identified as being caused by (1) chromatic dispersion, or (2) Polarization Mode Dispersion ("PMD").

Chromatic dispersion occurs when the various frequency components, or colors, of the optical signal pulse travel at different speeds through the optical fiber and arrive at the optical receiver at different times. This occurs because the index of refraction of a material, such as the optical fiber, varies with frequency or wavelength. As a result, the optical signal pulses are distorted through chromatic frequency-related pulse spreading.

Some of the major solutions for chromatic dispersion have included: (1) single-mode propagation, (2) Distributed Feedback ("DFB") lasers with narrow output spectra, and (3) low attenuation/modified-dispersion optical fibers. All of these advances have contributed to increased bandwidth by allowing the optical signal pulses to pass through the optical fiber with relatively low or reduced dispersion, and hence, relatively low or reduced optical signal distortion.

Single-mode propagation (or use of narrow wavelengths) was achieved through the development of single-mode optical fiber. This optical fiber allows only a single mode of light to propagate through the optical fiber. The DFB laser provides a light source to use with single-mode optical fibers. The DFB laser produces a light with an extremely narrow distribution of output frequencies and wavelengths, minimizing the chromatic dispersion problem. The low attenuation/modified-dispersion optical fiber provides a dispersion-shifted optical fiber that minimizes the speed-vs-wavelength dependency at a specific wavelength.

Previously, chromatic dispersion received greater attention because its adverse effects were initially more limiting at lower available bandwidths and data rates. Now, PMD receives considerable attention due to its potential limitation on optical transparent high-speed long-distance light wave systems, as well as on multi-channel cable television ("CATV") transmission systems.

PMD refers to distortions in the two orthogonal (right angle) light wave components of the polarized light signal pulses emitted by the optical transmitter. In an ideal optical fiber, which has a perfectly circular cross-section and is free from external stresses, the propagation properties of the two polarized light signal components are identical. However, imperfections introduced in the manufacturing process may result in an optical fiber that is not perfectly circular. In addition, an optical fiber that has been installed may suffer from external stresses such as pinching or bending. These manufacturing imperfections and external stresses cause the two polarization components of the polarized light pulses to have different propagation characteristics, which in turn give rise to PMD.

Despite the manufacturing-induced imperfections, optical fibers (for each optical frequency ω) have two input states ("principal states of polarization", or "PSP"s) in which a matching light pulse will undergo no PMD spreading. However, light pulses can be input into a fiber in an arbitrary state, and this leads to the pulses being split into two components that propagate independently through the fiber at different velocities. When these components reach the end of the fiber they recombine as two sub-pulses split in time. The delay between the two sub-pulses is designated as the differential group delay ("DGD"), τ.

The DGD and the PSPs of a long fiber are not only dependent on the wavelength or frequency of the optical pulses, but they also fluctuate in time as a result of environmental variations such as temperature changes, external mechanical constraints, and so forth. Their behavior is random, both as a function of wavelength at a given time and as a function of time at a given wavelength.

In a fiber optic transmission system, the optical pulse signal has a bandwidth or range of optical frequencies. "Second order PMD" describes the change of PMD with changing frequency, and is seen as both (i) a changing DGD with the changing optical frequency, and (ii) a changing output polarization with the changing optical frequency.

The impact of first and second order PMD in high bit rate (10 Gb/s) systems has been analyzed. It was found that the second order PMD could lead to important performance losses in addition to the performance penalties caused by the first-order PMD. For the case of large values of chromatic dispersion, second order PMD becomes in fact a major source of performance degradation. Moreover, with the advent of PMD compensators, which typically compensate for the first order effects only (leaving higher orders unaffected or even increasing them), impairments due to accumulated second-order PMD are to be expected.

Second-order PMD is an important issue for a proper assessment of system performance. To emulate the real world fiber, a PMD emulator should not only include the first, but also the second-order. Today's emulators have the strategy to mimic as closely as possible the behavior of long standard fibers with strong polarization mode coupling, both in the time and frequency (wavelength) domain. They typically consist of many segments of high birefringent fibers coupled by rotatable connectors or polarization scramblers. However, the instantaneous PMD (DGD and second-order) value of these PMD emulators is unknown.

Therefore, it is very clear that it is important not only to have controllable first-order DGD, but it is also increasingly necessary to enable methods and apparatus for providing controllable second-order PMD. This is essential for the thorough study, analysis, and testing of real world fiber installations, for a proper assessment of the PMD (including both first order DGD and higher order PMD) induced system penalty, and for the test and analysis of PMD compensators and other optical network components with PMD.

Solutions to problems of this sort have been long sought, but have long eluded those skilled in the art.

DISCLOSURE OF THE INVENTION

The present invention provides a method and apparatus for providing controllable second-order polarization mode dispersion for fiber optic transmission systems. A section of fixed high birefringent optical fiber, a polarization controller, and a variable differential group delay module are provided. The polarization controller is connected to the optical fiber section, and the variable differential group delay module is connected to the polarization controller. The variable differential group delay module is controlled to vary the second-order polarization mode dispersion values at an output of the high birefringent optical fiber section. The controllable second-order polarization mode dispersion of the present invention provides substantial operational and real-time advantages previously unavailable for high-speed fiber optic transmission systems.

Certain embodiments of the invention have other advantages in addition to or in place of those mentioned above. The advantages will become apparent to those skilled in the art from a reading of the following detailed description when taken with reference to the accompanying drawings.

BRIEF DESCRIPTION OF THE DRAWINGS

FIG. 3 is a flow chart of a method for providing controllable second-order polarization mode dispersion in accordance with the present invention.

BEST MODE FOR CARRYING OUT THE INVENTION

Figure 1:
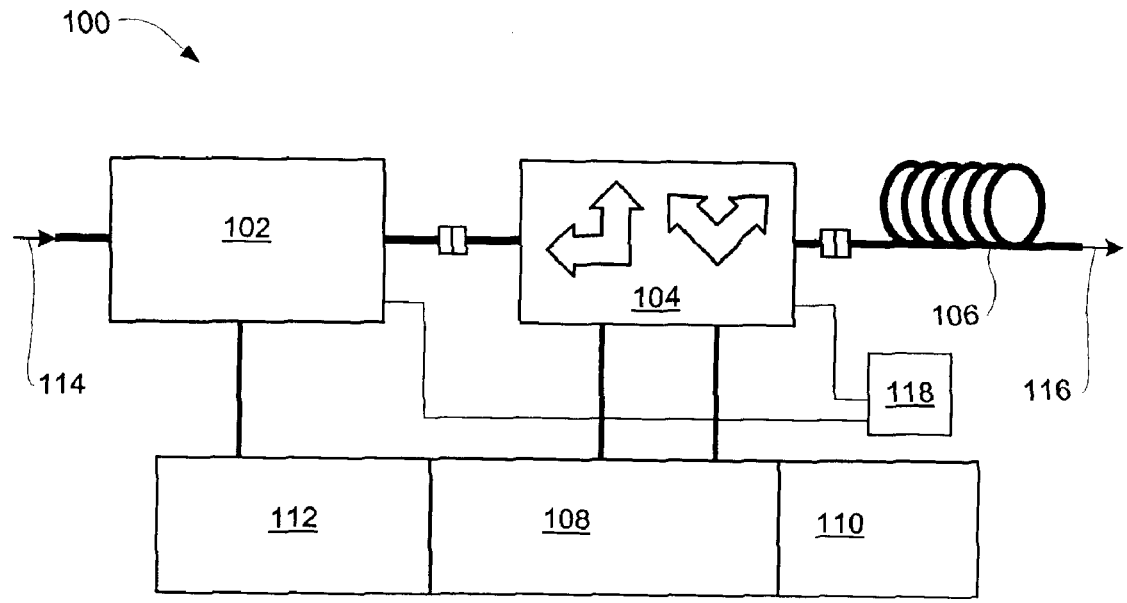
FIG. 1 is a schematic of a system for providing controllable second-order polarization mode dispersion in accordance with the present invention.

An important characteristic of optical fibers is that, for any given optical frequency $\omega$, one can always find two orthogonal input principal states of polarization ("PSP"s) such that a light pulse, having its input state of polarization ("SOP") matched with the input PSP, undergoes no spreading. However, an input light pulse with an arbitrary SOP can always be decomposed into two sub-polarization components aligned with each of the two axes of the orthogonal PSPs. The two components, propagating independently through the fiber at different group velocities, will recombine at the end of the fiber as a superposition of two sub-pulses split in time. The delay between those two sub-pulses is designated as the differential group delay ("DGD"), $\tau$. A natural measure of PMD is the PMD vector $\Omega(\omega)$, which is dependent on the optical frequency $\omega$. The magnitude of the PMD vector $\Omega(\omega)$ is equal to the DGD between the two PSPs, $|\Omega(\omega)|=\tau$, while its direction determines the direction of the two orthogonal PSPs, $\pm\Omega(\omega)/|\Omega(\omega)|$.

However, the DGD and PSPs of a long fiber are dependent on wavelength and fluctuate in time as a result of environmental variations such as temperature variations, external mechanical constraints, etc. Their behavior is random, both as a function of wavelength at a given time and as a function of time at a given wavelength. Fortunately, this behavior can be characterized statistically. It can be demonstrated that the probability density function ("PDF") of the randomly changing DGD values in a real fiber follows a Maxwellian Density Distribution. By definition, PMD is its rms value; that is: $PMD=\sqrt{<DGD^2>}$. It is essential to keep in mind that DGD fluctuates in time and can be either smaller or larger than its rms value or PMD.

In the fiber optic transmission system, the optical pulse signal has a bandwidth or range of optical frequencies. "Second order PMD" describes the change of PMD with frequency and is manifested by (i) a changing DGD with the frequency, and (ii) a rotation of the PSPs on the Poincare Sphere with frequency, which will result in a changing output polarization with changing optical frequency.

The impact of first and second order PMD in high bit rate (10 Gb/s) systems has been analyzed. It was found that the second order PMD could lead to important fluctuations around the mean penalties induced by the first-order PMD. For the case of large values of chromatic dispersion, second order PMD becomes in fact a major source of performance degradation. Moreover, with the advent of PMD compensators, which typically compensate for the first order effects only (leaving higher orders unaffected or even increasing them), impairments due to accumulated second-order PMD are to be expected.

Second-order PMD is an important issue for a proper assessment of system performance. To emulate the real world fiber, a PMD emulator should not only include the first, but also the second-order. Today's emulators have the strategy to mimic as closely as possible the behavior of long standard fibers with strong polarization mode coupling, both in the time and frequency (wavelength) domain. They typically consist of many segments of high birefringent fibers concatenated by rotatable connectors or polarization scramblers. However, the instantaneous PMD (DGD and second-order) value of these PMD emulators is unknown.

Therefore, it is very clear that for a thorough study, analysis, and test of real world fiber installations, for a proper assessment of the PMD (including both first order DGD and higher order PMD) induced system penalties, for the test and analysis of PMD compensators and other optical network components with PMD, not only is it important to be able to have controllable first-order DGD, but it is also increasingly necessary to enable methods and apparatus for providing controllable second-order PMD.

Referring now to FIG. 1, therein is shown, in schematic form, a system 100 for providing controllable second-order polarization mode dispersion ("PMD") according to the present invention. The system 100 includes a variable Differential Group Delay ("DGD") module 102, a polarization controller 104, and an optical fiber section 106. The optical fiber section 106 is a segment of fixed high birefringent optical fiber.

value, $\tau_{fixed}$, which is preset at different fixed values (e.g., 30 ps) depending on the range of the total second-order PMD value to be provided. A suitable variable DGD module is available, for example, from General Photonics.

For the polarization controller 104, suitable programmable polarization controllers are available, for example, from Corning, General Photonics, Optellios, and others. The phase angle of the wave-plate of such polarization controllers can be controlled in known fashion by a conventional digital-to-analog ("D/A") converter, such as a D/A converter 108 under the control of a CPU 110, which also controls the variable DGD module 102 through a digital I/O 112 connected thereto as shown in FIG. 1.

For the optical fiber section 106, suitable high birefringent optical fibers of various values are available, for example, from Corning (PureMode™ 15-U40), Fujikura (SM.15-P-8/125-UV/UV-400), and Fibercore (HB1500T).

The optical link in the variable DGD module 102 opposite the polarization controller 104 then serves as an input 114 for the system 100, and the end of the optical fiber section 106 opposite the polarization controller 104 then serves as an output 116 for the system 100.

Power supplies are provided as appropriate, such as a DC power supply 118 for the variable DGD module 102 and the polarization controller 104.

To understand the invention from a theoretical standpoint, assume that the coupling angle between the PSP of the variable DGD module 102 and that of the high birefringent optical fiber section is $\phi$. The overall PMD vector of the system 100, $\Omega_{total}$, can then be described as:

$$\vec{\Omega}_{total}(\omega) = \frac{1}{2}\tau_{fixed}\vec{e}_2 + \frac{1}{2}\tau_{variable}(\vec{e}_1 \cdot \vec{e}_2)\vec{e}_2 + \frac{1}{2}\tau_{variable}\cos(\tau_{fixed}\omega)(\vec{e}_1 - (\vec{e}_1 \cdot \vec{e}_2)\vec{e}_2) + \frac{1}{2}\tau_{variable}\sin(\tau_{fixed}\omega)(\vec{e}_1 \times \vec{e}_2)$$

(1)

The variable DGD module 102, the polarization controller 104, and the optical fiber section 106 are spliced together in this order, as shown, with the polarization controller 104 being between the variable DGD module 102 and the high birefringent optical fiber section 106.

In one embodiment, the variable DGD module 102 has a DGD value, $\tau_{variable}$, which is tunable from 0 to 45 ps, and the high birefringent optical fiber section has a fixed DGD where $\vec{\Omega}_{variable} = \tau_{variable}\vec{e}_1$ is the PMD vector of the variable DGD module 102 and $\vec{\Omega}_{fixed} = \tau_{fixed}\vec{e}_2$ is the PMD vector of the optical fiber section 106. It can be assumed that both PMD vectors are independent of wavelength (a very good first-order approximation for high birefringent optical fibers and commonly used variable DGD modules). According to equation (1), one can calculate the amount of second-order PMD as, $$\left|\frac{\partial}{\partial \omega}\vec{\Omega}_{total}(\omega)\right| = \left|-\frac{1}{2}\tau_{variable}\tau_{fixed}\sin(\tau_{fixed}\omega)(\vec{e}_1 - \cos(\phi)\vec{e}_2) + \frac{1}{2}\tau_{variable}\tau_{fixed}\cos(\tau_{fixed}\omega)\sin(\phi)\vec{e}_3\right|$$

$$= \sqrt{(\frac{1}{2}\tau_{variable}\tau_{fixed})^2(\sin^2(\tau_{fixed}\omega)(1+\cos^2(\phi)-2\cos^2(\phi))+\cos^2(\tau_{fixed}\omega\sin^2(\phi)))}$$

$$= \frac{1}{2}\tau_{variable}\tau_{fixed}|\sin(\phi)|$$

(2)

If considering the residual second-order PMD contribution, $O(\omega)$, of the variable DGD module 102 and the optical fiber section 106, equation (2) can be modified as, $$\left|\frac{\partial}{\partial \omega}\vec{\Omega}_{total}(\omega)\right| = \frac{1}{2}\tau_{variable}\tau_{fixed}|\sin(\phi)| + O(\omega) \quad (3)$$

When the coupling or phase angle $\phi$ between the variable DGD module 102 and the optical fiber section 106 is optimized, equation (3) predicts that the total output second-order PMD value is proportional to $\tau_{variable}$ and is tunable from $O(\omega)$ to $$\frac{1}{2}\tau_{variable}\tau_{fixed} + O(\omega),$$

with $O(\omega)$ representing the residual second-order PMD contribution from the optical fiber section 106 and the variable DGD module 102.

In operation, the first step is to find the optimum coupling or phase angle $\phi_{optimum}$ of the polarization controller 104 at each DGD of the variable DGD module 102. When the DGD value of the variable DGD module 102 changes, its PSP changes and therefore $\phi$ changes. Thus, there is an optimized $\phi$ for each value of the variable DGD and the phase angle needs to be readjusted to be optimized. The optimized coupling angle makes the value of $|\sin(\phi)|$ predictable so that the second-order PMD output is linearly proportional to $\tau_{variable}$.

Then, after $\phi_{optimum}$ is found for each DGD value, the second step is to tune to the specific desired DGD of the variable DGD module 102 and its $\phi_{optimum}$ in order to get the desired second-order PMD values at the output 116 of the optical fiber section 106.

More specifically, the phase angle between the principle polarization state of the variable DGD module 102 and that of the optical fiber section 106 is first optimized by setting the variable DGD module 102 at a certain DGD value and then measuring the total second-order PMD value at different phase angles of the wave-plate of the polarization controller 104. The optimized phase angle for any given DGD value is the angle that gives the overall maximum second-order PMD value at that DGD value of the variable DGD module 102, and can be identified under the control of the circuitry in the CPU 110. After the optimized phase angle is identified, the second-order PMD value at each DGD value of the variable DGD module 102 can be determined, and this determination can also be provided under the control of the circuitry in the CPU 110. For example, using a high birefringent optical fiber section with a fixed DGD value of about 32.5 ps, the second-order PMD is tunable from about 66 $ps^2$ to 784 $ps^2$ as the variable DGD module 102 is tuned from 0.68 ps to 45.18 ps.

Figure 2:
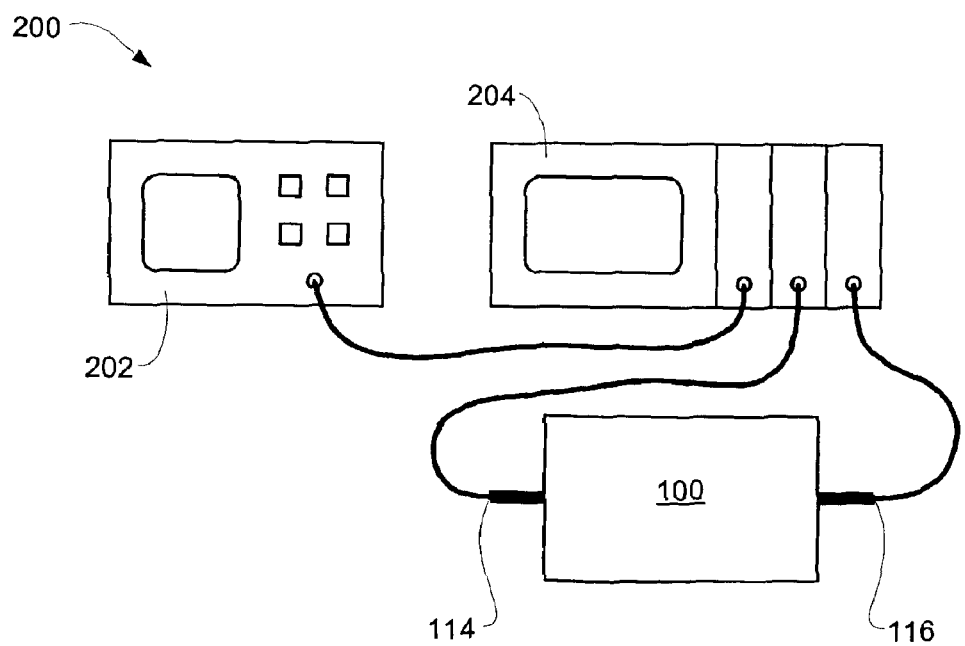
FIG. 2 is a schematic for measuring and calibrating the system of FIG. 1 in accordance with the present invention.

Referring now to FIG. 2, therein is shown a schematic 200 for measuring and calibrating the system 100. As illustrated, a tunable laser 202 provides test optical signals to a PMD analyzer 204, which in turn is connected to the system 100 of the present invention. A suitable tunable laser is available from Agilent (model 8163 A), and a suitable PMD analyzer is available from Profile (Pat 9000 B).

The test optical signals are generated by the tunable laser 202 as described above, initially measured for later comparison by the PMD analyzer 204, passed through the system 100 (i.e., through the variable DGD module 102, the polarization controller 104, and the optical fiber section 106) by means of the input 114 and the output 116 thereof. The resultant signals are returned to the PMD analyzer 204 to compare the signal with that originally generated by the tunable laser 202 for determining the second-order PMD values.

Referring now to FIG. 3, therein is shown a flow chart of a method 300 for providing controllable second-order PMD for fiber optic transmission in accordance with the present invention. The method includes a step 302 of providing a variable differential group delay module; a step 304 of providing an optical fiber section of fixed high birefringent optical fiber; a step 306 of providing a polarization controller connected between the variable differential group delay module and the optical fiber section; and a step 308 of tuning the variable differential group delay module to control the second-order polarization mode dispersion values at the optical fiber section output.

It has been discovered that, when higher-order PMD effects become significant, pure first-order compensators are no longer sufficient and a solution such as taught herein becomes very important, particularly because, due to the randomly changing behavior of the PMD, it is almost impossible to predict the instantaneous DGD value of a network system.

Thus, it has been further discovered that the controllable second-order polarization mode dispersion method and apparatus of the present invention furnish important and heretofore unavailable solutions and capabilities for high bit rate optical fiber optical network systems. By using a linearly tunable variable DGD module, the controllable second-order polarization mode dispersion system can be reliably calibrated.

For example, by linearly tuning the variable DGD module 102 of the embodiment described above, the system 100 demonstrates a second-order PMD value from about 50 $ps^2$ to $$\frac{1}{2} * \tau_{variable}^{max} * \tau_{fixed} + 50 \text{ in } ps^2,$$

with accuracy better than 50 $ps^2$. Thus, the controllable second-order PMD system provides known second-order PMD values without having to measure them, and can be linked directly to the corresponding problematic system, providing substantial, real-time operational functional advantages heretofore unknown and unavailable.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method for providing controllable second-order polarization mode dispersion for fiber optic transmission, comprising:

providing an optical fiber section of fixed high birefringent optical fiber;
providing a polarization controller connected to the optical fiber section;
providing a variable differential group delay module connected to polarization controller;
controlling the variable differential group delay module to vary the second-order polarization mode dispersion values at an output of the high birefringent optical fiber section; and
optimizing the phase angle between the variable differential group delay module and the optical fiber section by:
setting the variable differential group delay module at a predetermined differential group delay value;
measuring the second-order polarization mode dispersion values at different phase angles of the polarization controller; and
identifying the optimized phase angle as the phase angle of the polarization controller that gives the overall maximum second-order polarization mode dispersion values at each differential group delay value of the variable differential group delay module.

2. The method of claim 1, further comprising, after identifying the optimized phase angle, determining the second-order polarization mode dispersion value at each differential group delay value of the variable differential group delay module.

3. The method of claim 1 further comprising measuring and calibrating the second-order polarization mode dispersion values by:
providing a tunable laser for providing test optical signals;
providing a polarization mode dispersion analyzer connected to the tunable laser and to the input to the variable differential group delay module and to the output of the optical fiber section;
initially measuring the optical signal generated by the tunable laser;
passing the test optical signal from the tunable laser through the variable differential group delay module, the polarization controller, and the optical fiber section; and
analyzing the resultant optical signal using the polarization mode dispersion analyzer to compare the resultant signal with that originally generate by the tunable laser, to determine the second-order polarization mode dispersion values.

4. The method of claim 1 further comprising:
tuning the variable differential group delay module; and
calibrating the resulting second-order polarization mode dispersion values in response to the tuning of the variable differential group delay module to provide second-order polarization mode dispersion values correlated with the settings of the variable differential group delay module.

5. A method for providing controllable second-order polarization mode dispersion for fiber optic transmission, comprising:
providing an optical fiber section of fixed high birefringent optical fiber;
providing a polarization controller optically connected to the optical fiber section;
providing a variable differential group delay module connected to the polarization controller;
inputting optical signals into the variable differential group delay module;
passing the optical signals from the variable differential group delay module to the polarization controller;
passing the optical signals from the polarization controller to the optical fiber section;
outputting the optical signals from the optical fiber section;
optimizing the phase angle between the variable differential group delay module and the optical fiber section;
runing the variable differential group delay module to vary the second-order polarization mode dispersion values at the output of the high birefringent optical fiber section opposite the polarization controller; and
optimizing the phase angle by:
setting the variable differential group delay module at a predetermined differential group delay value;
measuring the total second-order polarization mode dispersion values at different phase angles of the polarization controller; and
indentifying the optimized phase angle as the phase angle of the polarization controller that gives the overall maximum second-order polarization mode dispersion values at each differential group delay value of the variable differential group delay module.

6. The method of claim 5 further comprising, after obtaining the optimized phase angle, determining the second-order polarization mode dispersion value at each differential group delay value of the variable differential group delay module.

7. The method of claim 5 further comprising measuring and calibrating the second-order polarization mode dispersion values by:
providing a tunable laser for providing test optical signals;
providing a polarization mode dispersion analyzer connected to the tunable laser and to the input to the variable differential group delay module and to the output of the optical fiber section;
initially measuring the optical signal generated by the tunable laser;
passing the test optical signal from the tunable laser through the variable differential group delay module, the polarization controller, and the optical fiber section; and
analyzing the resultant optical signal using the polarization mode dispersion analyzer to compare the resultant signal with that originally generated by the tunable laser, to determine the second-order polarization mode dispersion values.

8. The method of claim 5, wherein the variable differential group delay module is linearly tunable, and further comprising:
linearly tuning the variable differential group delay module; and
calibrating the resulting second-order polarization mode dispersion values in response to the linear tuning of the variable differential group delay module to subsequently provide known second-order polarization mode dispersion values correlated with the linear settings of the variable differential group delay module without having to measure such second-order polarization mode dispersion values.

9. A second-order polarization mode system for fiber optic transmission, comprising:
an optical fiber section of fixed high birefringent optical fiber;

a polarization controller connected to the optical fiber section; and a variable differential group delay module connected to the polarization controller, the variable differential group delay module including:

a control for varying the second-order polarization mode dispersion values at an output of the high birefringent optical fiber section; and identification circuitry for identifying an optimized phase angle as the phase angle of the polarization controller that gives the overall maximum second-order polarization mode dispersion values at each differential group delay value of the variable differential group delay module.

10. The second-order polarization mode system as claimed in claim 9 wherein the variable differential group delay module includes mode value circuitry for determining the second-order polarization mode dispersion value at each differential group delay value of the variable differential group delay module.

11. The second-order polarization mode system as claimed in claim 9, additionally comprising:

a tunable laser for providing test optical signals; and a polarization mode dispersion analyzer connected to the tunable laser and to an input to the variable differential group delay module and to the output of the optical fiber section, the polarization mode dispersion analyzer being operable for initially measuring the optical signal generated by the tunable laser, and being operable for analyzing the resultant optical signal to determine the second-order polarization mode dispersion values.

12. The second-order polarization mode system as claimed in claim 9, additionally comprising:

a tunable laser for providing test optical signals; and circuitry for calibrating the resulting second-order polarization mode dispersion values in response to the controlling of the variable differential group delay module to provide second-order polarization mode dispersion values correlated with settings of the variable differential group delay module.

13. A second-order polarization mode system for fiber optic transmission, comprising:

an optical fiber section of fixed high birefringent optical fiber;

a polarization controller optically connected to the optical fiber section;

a variable differential group delay module optically connected to the polarization controller, the variable differential group delay module including a control for varying the second-order polarization mode dispersion values at an output of the high birefringent optical fiber section;

the polarization controller including a control for optimizing the phase angle between the variable differential group delay module and the optical fiber section; and the variable differential group delay module including indentification circuitry for identifying the optimized phase angle as the phase angle of the polarization controller that gives the overall maximum second-order polarization mode dispersion values at each differential group delay value of the variable differential group delay module.

14. The second-order polarization mode system as claimed in claim 13 wherein the variable differential group delay module includes mode value circuitry for determining the second-order polarization mode dispersion value at each differential group delay value of the variable differential group delay module.

15. The second-order polarization mode system as claimed in claim 13, additionally comprising:

a tunable laser for providing test optical signals; and a polarization mode dispersion analyzer connected to the tunable laser and to an input to the variable differential group delay module and to the output of the optical fiber section, the polarization mode dispersion analyzer being operable for initially measuring the optical signal generated by the tunable laser, and being operable for analyzing the resultant optical signal to determine the second-order polarization mode dispersion values.

16. The second-order polarization mode system as claimed in claim 13, additionally comprising:

a tunable laser for providing test optical signals; and circuitry for calibrating the resulting second-order polarization mode dispersion values in response to linear controlling of the variable differential group delay module to subsequently provide second-order polarization mode dispersion values correlated with the linear settings of the variable differential group delay module without having to measure such second-order polarization mode dispersion values.

* * * * *

UNITED STATES PATENT AND TRADEMARK OFFICE
CERTIFICATE OF CORRECTION

PATENT NO. : 6,928,201 B2  Page 1 of 1
DATED : August 9, 2005
INVENTOR(S) : Zeng It is certified that error appears in the above-identified patent and that said Letters Patent is hereby corrected as shown below:

Column 1,
Line 26, after "optical" delete "is".

Column 9,
Line 47, delete "generate" and insert therefor -- generated --.
Line 56, before "settings" delete "the".

Column 10,
Line 11, delete "runing" and insert therefor -- tuning --.

Column 11,
Line 9, delete "indentifying" and insert therefor -- identifying --.
Line 29, before "optical" insert -- test --.

Column 12,
Line 11, delete "indentification" and insert therefor -- identification --.
Line 11, delete "indentifying" and insert therefor -- identifying --.
Line 32, before "optical" insert -- test --.

Signed and Sealed this

Fourth Day of October , 2005

JON W. DUDAS
*Director of the United States Patent and Trademark Office*